J. M. KING.
FISHHOOK.
APPLICATION FILED JULY 2, 1921.

1,401,086.

Patented Dec. 20, 1921.

J M King, INVENTOR.

BY Geo. P. Kimmel, ATTORNEY.

UNITED STATES PATENT OFFICE.

JAMES MANNING KING, OF LIVINGSTON, TEXAS.

FISHHOOK.

1,401,086. Specification of Letters Patent. Patented Dec. 20, 1921.

Application filed July 2, 1921. Serial No. 482,102.

*To all whom it may concern:*

Be it known that I, JAMES MANNING KING, a citizen of the United States, residing at Livingston, in the county of Polk and State of Texas, have invented certain new and useful Improvements in a Fishhook, of which the following is a specification.

This invention relates to swivel connectors for fish hooks and other articles.

The object of the invention is to provide a simple and efficient attachment for swivelly connecting a fish hook with a line to allow a rotary movement of the hook entirely independent of the line and which may be constructed of a simple piece of stiff wire thereby providing a very cheap device of this character yet one thoroughly effective for the purpose designed.

With these and other objects in view, the invention consists in certain novel features of construction as hereinafter shown and described and then specifically pointed out in the claim, and in the drawings illustrative of the preferred embodiment of the invention.

In the embodiment illustrated the swivel 1 constituting this invention is primarily intended for use in connecting a fish hook H to a line but obviously it may be used for connecting other articles. This swivel comprises two sleeve-like members 2 and 3 arranged one across the end of the other with the bores thereof positioned in planes at right-angles to each other, said sleeves being united by a connector 4.

Figure 1:
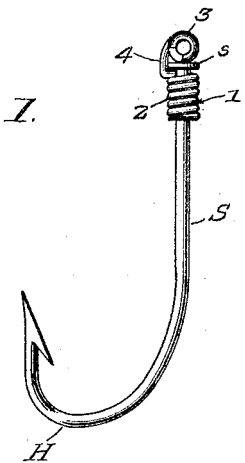
Figure 1 represents a side elevation of a fish hook equipped with this improved connector.
Figure 2:
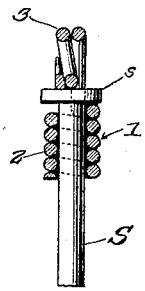
Fig. 2 is a sectional view of the connector shown applied the shank of the hook being in elevation.
Figure 3:
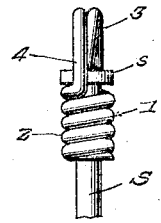
Fig. 3 is a similar view of the fish hook shank with the connector applied and in a position at right angles to that shown in Fig. 1.

Those sleeve-like members 2 and 3 and their connector 4 are preferably constructed of a single piece of stiff wire coiled to form the sleeves, the sleeve 3 being shorter than sleeve 2 and designed to form an eye for connection of the fishing line while the other sleeve 2 is intended to encircle the shank S of the fish hook when the device is employed for connecting a hook to a line. When so used the sleeve-like eye 3 is arranged over a stop $s$ formed on the free end of the shank S as is shown clearly in Figs. 1 and 4 the connecting element 4 being arranged diagonally and uniting the two members 2 and 3 at one side.

The connector 4 is of sufficient length to space the eye 3 from the end of sleeve 2 a sufficient distance to permit the insertion between them of the head or stop $s$ of the shank S and when so mounted it will be obvious that the shank S may turn freely in the sleeve 2 independently of the line which is connected with eye 3.

The use of this connector 1 when applied to a fish hook prevents the staging which is a short line between the hook and the trotline from being twisted and broken such as is likely to occur when the line is twisted by a large fish in swift water.

The preferred embodiment of the invention is disclosed in the drawings and set forth in the specification, but it will be understood that any modifications within the scope of the claim may be made in the construction without departing from the principle of the invention or sacrificing any of its advantages.

What I claim is:

A fish hook connector for fishing tackle composed of a single piece of wire coiled and bent to form two sleeve-like members arranged one across the end of the other and united, the crosswise disposed sleeve being spaced from the end of the other a sufficient distance to provide for the insertion between them of the head of a fish hook shank which latter is inserted in said lengthwise sleeve and held against longitudinal movement by said crosswise disposed sleeve bearing on the outer face of said head.

In testimony wherof, I affix my signature hereto.

JAMES MANNING KING.